United States Patent
Futterer et al.

(10) Patent No.: US 7,737,201 B2
(45) Date of Patent: Jun. 15, 2010

(54) MOULDED MASS FOR PRODUCING OBJECTS THAT ARE POORLY INFLAMMABLE, PIGMENT THEREFOR, AND USE OF THE SAME

(75) Inventors: Thomas Futterer, Ingelheim (DE); Hans-Dieter Naegerl, Dudenhofen (DE); Vincens Mans Fibla, Badalona (ES); Ruediger Wissemborski, Gau-Algesheim (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 113 days.

(21) Appl. No.: 11/665,364

(22) PCT Filed: Oct. 14, 2005

(86) PCT No.: PCT/EP2005/055285

§ 371 (c)(1), (2), (4) Date: Oct. 27, 2008

(87) PCT Pub. No.: WO2006/042833

PCT Pub. Date: Apr. 27, 2006

(65) Prior Publication Data

US 2009/0124735 A1 May 14, 2009

(30) Foreign Application Priority Data

Oct. 15, 2004 (DE) .................. 10 2004 050 478

(51) Int. Cl.
*C08K 5/3492* (2006.01)
(52) U.S. Cl. .................... 524/100; 524/99; 524/101
(58) Field of Classification Search .............. 524/99, 524/100, 101
See application file for complete search history.

(56) References Cited

U.S. PATENT DOCUMENTS 5,063,137 A    11/1991  Kiyonari et al. ............ 430/292
6,214,916 B1    4/2001  Mercx et al. ............... 524/404
6,482,879 B2   11/2002  Hieltjes et al. ............ 524/398
6,706,785 B1    3/2004  Fu .............................. 523/200
2009/0048373 A1 * 2/2009 Clauss et al. ................ 524/86

FOREIGN PATENT DOCUMENTS

| | | |
|---|---|---|
| DE | 3917294 | 11/1990 |
| DE | 19531490 | 2/1997 |
| DE | 19905358 | 8/2000 |
| DE | 10053639 | 5/2002 |
| DE | 10145093 | 4/2003 |
| DE | 10252007 | 5/2004 |
| DE | 69531576 | 6/2004 |
| EP | 345032 | 12/1989 |
| EP | 542115 | 11/1992 |
| EP | 764683 | 3/1997 |
| EP | 1196488 | 4/2002 |
| JP | 1222994 | 9/1989 |
| WO | WO99/55773 | 11/1999 |
| WO | WO00/02869 | 1/2000 |
| WO | WO2004/050766 | 6/2004 |

* cited by examiner

*Primary Examiner*—Peter Szekely
(74) *Attorney, Agent, or Firm*—Michael L. Dunn

(57) ABSTRACT

A molding material for the production of highly flame resistant articles with a matrix formed from a thermoplastic and with a particulate flame retardant pigment dispersed therein, wherein under the influence of laser light the material changes color due to a change in color of the pigment or of the plastic matrix, and in that the pigment is a reaction product of at least one halogen-free flame retardant organic nitrogen base with a composition comprising at least one salt which can be reacted with the organic nitrogen base. The invention also includes a method for the preparation of a molding material as described above by the dispersion of a particulate flame retardant pigment to a plastic material, wherein under the influence of laser light the material changes color due to a change in color of the pigment or of the plastic matrix, and in that the pigment is a reaction product of at least one halogen-free flame retardant organic nitrogen base with a composition comprising at least one salt which can be reacted with the organic nitrogen base. The invention also includes a highly flame resistant and laser-writable plastic article comprising a formed material as described above.

16 Claims, No Drawings

MOULDED MASS FOR PRODUCING OBJECTS THAT ARE POORLY INFLAMMABLE, PIGMENT THEREFOR, AND USE OF THE SAME

BACKGROUND OF THE INVENTION

Adding flame retardant material in the form of fine particles to plastics and dispersing those fine particles through the whole plastic article or in its surface regions is known. As an example, German patent specification DE-A-101 45 093 describes polyphosphates of organic nitrogen bases, such as guanidine and melamine or melamine derivatives, as a flame protection agent (retardant) in plastics and as a flame proofing agent in textiles. International patent WO-A-00/02869 describes polyphosphate salts, in particular in glass fibre-reinforced polyamides and polyesters, as flame protection agents. Other organic nitrogen bases are proposed in many other publications as flame protection agents, the tendency in this branch of the industry being to use halogen-free flame protection agents such as aluminium hydroxide, magnesium hydroxide or melamine cyanurate for that purpose.

When such flame protection agents are distributed in halogen-free thermoplastic plastics, a disadvantageous effect may occur which changes the properties of the plastic in an undesirable manner.

In many fields of application, it is desirable to make plastic articles which are flame-proof and capable of being written or marked using laser light; there is a practical problem, however, as halogen-free flame-proof flame protection agents do not exhibit sufficient contrast, and so they turn out to be of no practical use.

BRIEF DESCRIPTION OF THE INVENTION

The aim of the invention is to provide plastic moulding materials which can ensure that plastic articles can be made laser-writable without essentially deleteriously affecting the properties of the plastic. The moulding material of the invention for the production of highly flame resistant articles with a matrix formed from a thermoplastic and with a particulate flame retardant pigment dispersed therein is characterized in that under the influence of laser light the pigment changes colour or the colour of the plastic matrix changes, and in that the pigment is a reaction product of at least one halogen-free flame retardant organic nitrogen base with a salt or a salt mixture which can be reacted with the organic nitrogen base.

Otherwise stated, the invention is a molding material for the production of highly flame resistant articles with a matrix formed from a thermoplastic and with a particulate flame retardant pigment dispersed therein, wherein under the influence of laser light the material changes color due to a change in color of the pigment or of the plastic matrix, and in that the pigment is a reaction product of at least one halogen-free flame retardant organic nitrogen base with a composition comprising at least one salt which can be reacted with the organic nitrogen base. The invention also includes a method for the preparation of a molding material as described above by the dispersion of a particulate flame retardant pigment to a plastic material, wherein under the influence of laser light the material changes color due to a change in color of the pigment or of the plastic matrix, and in that the pigment is a reaction product of at least one halogen-free flame retardant organic nitrogen base with a composition comprising at least one salt which can be reacted with the organic nitrogen base. The invention also includes a highly flame resistant and laser-writable plastic article comprising a formed material as described above.

DETAILED DESCRIPTION OF THE INVENTION

Any known thermoplastic may be used as the matrix material, optionally glass fibre-reinforced, which is described, for example, in Ullmann's Encyclopedia of Chemistry (volume 15, page 457) and which has already been used for laser marking. Examples of suitable plastics are polyethylene, polypropylene, polyamide, polyester, polyphenylene oxide, polyacetal, polybutylene terephthalate, polymethacrylate, polyoxymethylene, polyvinylacetal, polystyrene, acrylic-butadiene-styrene (ABS), acrylonitrile-styrene-acrylic ester (ASA), polycarbonate, polyether sulphone, polyethylether ketone, polyvinylchloride and thermoplastic polyurethane.

Preferred polyesters are thermoplastic polymers with repeating ester groups in the main chain. Examples are polycondensation products of naphthalene dicarboxylic acid, terephthalic acid, isophthalic acid, adipic acid, azelaic acid, sebacinic acid, dodecane dioic acid and cyclohexane dicarboxylic acids with diols such as ethylene glycol, 1,3-propanediol, 1,4-butanediol, 1,4-butenediol or 1,6-hexanediol, 1,4-hexanediol, 1,4-cyclohexanediol, 1,4-di-(hydroxymethyl)-cyclohexane, bisphenol A, neopentylglycol, oligo- or poly-ethylene glycols, oligo- or poly-propylene glycols, oligo- or poly-(tetramethylene) glycols, mixtures of said diols and ester-forming derivatives thereof. Particularly preferred matrix components are polyethylene terephthalate, polybutylene terephthalate and polyether-ester block copolymers.

The polyamides which may be considered are thermoplastic polymers with repeating acid amide groups in the main chain, both homopolymers and copolymers with further co-monomer groups.

Examples are polyhexamethyleneadipinic acid amide, polyhexamethylene azelaic acid amide, polyhexamethylene sebacinic acid amide, polyhexamethylene dodecane dioic acid amide, poly-11-aminoundecane acid amide and bis-(p-amino-cyclohexyl)-methanedodecane acid amide or products obtained by ring opening of lactams, for example polycaprolactam or polylaurinlactam. Further, polyamides based on terephthalic or isophthalic acid as the acid components and/or trimethylhexamethylene diamine or bis-(p-aminocyclohexyl)-propane as the diamine component, as well as polyamide resins produced by copolymerizing two or more of the above polymers or their components, are suitable.

The thermoplastic polymers used as mixing partners can be any other partially crystalline, liquid crystalline or amorphous polymers.

Polyurethane is particularly suitable because its mechanical properties are good and it can be processed cheaply. Thermoplastic polyurethanes are well known from many publications in the literature and from patents.

Highly surprisingly, the components of the salt produce an improvement in contrast as regards laser-writability or -markability and simultaneously produce an improvement in flame protection.

The inventive effects described above are obtained by dint of the pigment which on the one hand has flame retardant properties and on the other hand produces laser-writability by absorption of laser light. This pigment is a reaction product of at least one halogen-free flame retardant organic nitrogen base with a reactive salt or salt mixture which can react with the nitrogen base. The organic nitrogen base is advantageously melamine or a melamine derivative such as melamine cyanurate, melamine orthophosphate, di-melamine orthophosphate, melamine pyrophosphate, melamine polyphosphate, melamine borate, a melamine salt of a phosphorus acid partial ester, one or more salts of phosphoroxy compounds, ammonium polyphosphate, boron phosphate and combinations thereof. The flame protection agents used can also be used in triazine polymers, melem, melam, urea, guanidine etc.

The term "salt" as used herein means compounds which at least partially dissociate in water into cations and anions or consist of an acid residue and a base residue.

The term "colour change" can mean a transfer from one tone to another, such as from yellow to red, or from transparent to black. In the context of the invention, this term also means a change in lightness, for example from light brown to dark brown or to a colour change in the plastic matrix.

The term "particulate" means that the pigment is in the form of fine solid particles with quantitative parameters being given as the mean particle size ($d_{50}$) and the particle size of the primary particles. The size of the primary particles is in the nanometer to micrometer range. Suitable primary particles have a mean particle size ($d_{50}$) of less than 10 μm, preferably less than 5 μm.

Within the scope of the invention, the pigments in accordance with the invention can also contain further cations, in particular those from elements from periods 2 to 5 in group I. It is also possible to add to the pigments additional inorganic oxides and/or further colour-producing additives and/or additives which modify the usual properties, such as UV stabilizers, stabilizers against efflorescence, thermal and thermo-oxidative attacks, to improve hydrolytic and azidolytic resistance, lubricants, unmoulding aids, nucleation agents, fillers, softeners and other additives.

Normally, the elements are selected so that they have as strong an absorption as possible in the wavelength range of the laser light which is used.

The wavelength ranges of the laser light employed do not constitute a limitation. Suitable lasers generally have a wavelength in the range 157 nm to 10.6 mm. Examples are $CO_2$ lasers (10.6 mm) and Nd:YAG lasers (1064 nm) or pulsed UV lasers.

Typical excimer lasers have the following wavelengths: $F_2$ excimer laser (157 nm), ArF excimer laser (193 nm), XeCl excimer laser (308 nm), XeF excimer laser (351 nm), frequency multiplied Nd:YAG laser with wavelengths of 532 nm (frequency doubled), 355 nm (frequency trebled) or 265 nm (frequency quadrupled). Particularly preferably, Nd:YAG lasers (1064 or 532 nm) and $CO_2$ lasers are used. The energy densities of the lasers employed in the present invention are generally in the range from 0.3 mJ/cm$^2$ to 50 J/cm$^2$, preferably 0.3 mJ/cm$^2$ to 10 J/cm$^2$. When using pulsed lasers, the pulse frequency is generally in the range 1 to 30 kHz.

In the context of this description, the term "pigments" means organic or inorganic salt type compounds or mixtures of salt type compounds which change colour under the influence of a laser light source at the illuminated areas.

These compounds can be conventional salts with a definite stoichiometry of one or more anions with cations derived from different elements, but they can also be non-stoichiometric compounds. Anions of organic carboxylic acids as well as carbonic acids are preferred.

Any anion can be used, but anions of organic carboxylic acids as well as oxoanions with the exception of phosphinates, diphosphinates and/or their polymers and/or carbonic acid anions are preferred.

Preferred combinations are those in which the non-illuminated compound absorbs in the region of the light wavelength employed.

More preferred combinations are those in which the self colour of the non-illuminated compound can be adjusted by varying the mole ratios of the cations.

In a preferred embodiment of the invention, the non-illuminated compound has the highest possible lightness and as little as possible self colour. In this case, the illuminated compound should have as low a lightness as possible and nevertheless as little self colour as possible.

In a further preferred embodiment of the invention, the non-illuminated should have as high a lightness as possible and as little self colour as possible; on the other hand, the illuminated components should have the clearest possible self colour.

In a preferred embodiment of the composition of the invention, the anions of the above components have general formula $A_aO_o(OH)_y^{z-}$, where A=tri- or penta-valent phosphorus, tetra-valent molybdenum or hexa-valent tungsten;

a, o and z independently represent whole numbers with values from 1-20; and y is a whole number with values from 0-10.

In a further preferred embodiment of the composition of the invention, the pigment has at least one combination of two different elements of the group consisting of copper, tin, antimony and iron.

In a particularly preferred embodiment of the composition of the invention, the pigment contains anions of phosphorus (V) and/or phosphorus (III) acid, their condensation products or if appropriate with further hydroxide ions, and Cu and Fe or Cu and Sn or Cu and Sb or Sn and Fe as the cations.

Preferably, metallic salts are used which have a particularly high thermal stability so that no degradation occurs when doped into the polymer to produce the combination product. Salts or ligands with a thermal stability of over 200° C. (2% weight loss), preferably with a stability of over 250° C. (2% weight loss) and more particularly with a stability of over 300° C. (2% weight loss) are used.

Light sensitive flame protection agent combinations are obtained by doping, reacting and mixing the organic nitrogen bases with the metallic compounds. The term "doping" means both the production of mixtures of one or more of said solid ingredients in the powdered state as well as mixing one or more of said solid ingredients in a dissolved or suspended state with subsequent drying of the powdered product.

The products of the invention have flame retardant and laser-writable properties. The invention also concerns pigments for the manufacture of simultaneously flame retardant and laser-writable plastic articles with the features defined above for the moulding material. The invention also concerns the use of pigments with the features given above for the manufacture of similarly flame retardant and laser-writable plastic articles, in particular from thermoplastic.

EXAMPLE 1

Pigment for a moulding material of the invention was produced as follows: Copper hydroxide (0.1 mole) and isocyanuric acid (0.1 mole) were placed in a mixer with water and mixed by agitation. Thus, a neutralization reaction took place to form a salt. After 30 min, melamine (10 mole) and cyanuric acid (10 mole) were added in an exact ratio of 1:1. The whole mixture was stirred for 1 h and then vacuum dried at 110° C.

A moulding material of the invention was obtained with the pigment obtained by using the following ingredients. Its flame resistance and laser-writability were determined.

The laser was a commercially available Nd-YAG laser (wavelength 1064 nm). The contrast values were determined using a digital camera mounted on a microscope and image evaluation software. The flame resistance was determined using a UL Box in accordance with UL94. The CTI values were determined in accordance with standard DIN IEC 60112/VDE 0303 Part 1, RAL 7035.

| | |
|---|---|
| Polyamide 6,6/6 (mole ratio 1:1) | 88 wt % |
| Melamine cyanurate (produced as above) | 12 wt % |
| UL94 | V0 |
| Contrast (K value) | 4.2 |
| CTI | 520 |

The thermoplastic moulding materials obtained were distinguished by both their superb flame resistance (self-extinguishing) and by their high contrast values (K value) on laser-writing.

EXAMPLE 2

Pigment for a moulding material of the invention was produced as follows: A 50 l reactor with a stirrer was filled with 29.25 l of pure water. Orthophosphoric acid (74.75 mole) was added at ambient temperature, with stirring. Because the reaction was exothermic, the temperature of the reactor contents rose and was maintained at 50° C. for 10 minutes. Next, melamine (74.75 mole) was added slowly with stirring, avoiding clumping. After a homogeneous suspension had been obtained, copper hydroxide (7.47 mole) was added to the suspension. The whole mixture was stirred for 1 h at 100° C. then the temperature was raised and it was vacuum dried.

The doped melamine orthophosphate obtained was transformed into melamine polyphosphate in a furnace at 340° C. The product was then ground to a fineness of 5 microns.

| | |
|---|---|
| Polyamide | 50 wt % |
| Glass fibres | 30 wt % |
| Melamine cyanurate | 10 wt % |
| Melamine polyphosphate (produced as above) | 10 wt % |
| UL94 | V0 |
| Contrast (K value) | 2.8 |
| CTI | 590 V |

This moulding material also had superb flame resistance and laser-writability (K value).

What is claimed is:

1. A molding material for the production of highly flame resistant articles with a matrix formed from a thermoplastic and with a particulate flame retardant pigment dispersed therein, wherein under the influence of laser light the material changes color due to a change in color of the pigment or of the plastic matrix, and in that the pigment is a reaction product of at least one halogen-free flame retardant organic nitrogen base with a composition comprising at least one salt which can be reacted with the organic nitrogen base.

2. A molding material according to claim 1, wherein its pigment has a mean particle size ($d_{50}$) of less than 10 μm, preferably less than 5 μm.

3. A molding material according to claim 1 wherein the pigment contains salts with oxoanions in the absence of phosphinates, diphosphinates, polymers thereof anions of organic carboxylic acids, and anions of carbonic acid.

4. A molding material according to claim 3, wherein its pigment contains, as the anions, phosphorus-containing oxoanions.

5. A molding material according to claim 4 wherein the oxoanions are selected from the group consisting of phosphates, condensed phosphates, phosphonates, phosphites and mixed hydroxide-phosphate-oxoanions, cyanurate anions and mixtures thereof.

6. A molding material according to claim 1 wherein the anions of the pigment have the general formula $A_aO_o(OH)_y^{2-}$, wherein A represents tri- or penta-valent phosphorus, tetra-valent molybdenum or hexa-valent tungsten, a, o and z independently represent whole numbers in the range 1 to 20 and y represents a whole number between 0 and 10.

7. A molding material according to claim 1 wherein cations of the pigment consists essentially of copper, tin, antimony, iron, boron and mixtures thereof.

8. A molding material according to claim 1 wherein anions of the salts are selected from the group consisting of phosphorus (V) acid, phosphorus (III) acid, condensation products thereof, and mixtures thereof and may include hydroxyl ions and the cations are selected from the combinations of Cu and Fe, Cu and Sn, Cu and Sb, and Sn and Fe.

9. A pigment according claim 1 wherein the salts are selected so that the non-illuminated pigment absorbs in the region of the wavelength of the light to be used.

10. A molding material according to claim 1 wherein the thermoplastic matrix is selected from the group consisting of glass fibre-reinforced polypropylene, polyethylene, polyamide, polybutylene terephthalate, polyethylene terephthalate, polyester, polyphenylene oxide, polyacetal, polymethacrylate, polyoxymethylene, polyvinylacetal, polystyrene, acrylic-butadiene-styrene (ABS), acrylonitrile-styrene-acrylic ester (ASA), polycarbonate, polyether sulphone, polyether ketone, polyvinylchloride, thermoplastic polyurethane, copolymers thereof and mixtures thereof.

11. A molding material according to claim 1 wherein the halogen-free organic nitrogen base comprises melamine, melamine cyanurate, melamine orthophosphate, dimelamine orthophosphate, melamine pyrophosphate, melamine polyphosphate, melamine borate, a melamine salt of a phosphorus acid partial ester, further salts of III- and V-valent phosphoroxy compounds, ammonium polyphosphate, boron phosphate or mixtures thereof.

12. The molding material of claim 11 further including a modifying agent in the halogen-free organic nitrogen base.

13. The molding material of claim 12 wherein the modifying agent is selected from the group consisting of pentaerythritol, dipentaerythritol, THEIC, triacin polymers, urea, guanidine, melem, melam, phosphonic acid salts and mixtures thereof.

14. A method for the preparation of a molding material by the dispersion of a particulate flame retardant pigment to a plastic material, wherein under the influence of laser light the material changes color due to a change in color of the pigment or of the plastic matrix, and in that the pigment is a reaction product of at least one halogen-free flame retardant organic nitrogen base with a composition comprising at least one salt which can be reacted with the organic nitrogen base.

15. The method of claim 14 where the plastic is a thermoplastic.

16. A highly flame resistant and laser-writable plastic article comprising a formed material as described in claim 1.

* * * * *